US012798453B2

(12) United States Patent
Line et al.

(10) Patent No.: US 12,798,453 B2
(45) Date of Patent: Nov. 17, 2026

(54) VEHICLE SEAT AND STORAGE SYSTEM

(71) Applicant: Ford Global Technologies, LLC, Dearborn, MI (US)

(72) Inventors: Johnathan Andrew Line, Northville, MI (US); Javier Antonio Aguilar, Tultitlán (MX); Philip Skinner, Plymouth, MI (US); Shawn Anthony Dixon, Windsor (CA); Chuck R. Reese, Whitmore Lake, MI (US); Jose Maria Aburto, Oaxtepec (MX); Antonio Martinez Ilescas, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 18/790,475

(22) Filed: Jul. 31, 2024

(65) Prior Publication Data

US 2026/0034922 A1 Feb. 5, 2026

(51) Int. Cl.
*B60R 7/04* (2006.01)
*B60N 2/30* (2006.01)

(52) U.S. Cl.
CPC ............ *B60N 2/3047* (2013.01); *B60R 7/043* (2013.01)

(58) Field of Classification Search
CPC .......... B60N 2/3047; B60N 2002/0216; B60R 7/043; B60R 2011/0012; B60R 2011/0029; A47C 7/628
USPC ........... 296/65.01, 65.05, 37.15; 297/188.08, 297/188.12, 188.1
See application file for complete search history.

(56) References Cited

U.S. PATENT DOCUMENTS 6,161,896 A * 12/2000 Johnson .................. B60R 7/043 297/188.1
9,950,674 B1 4/2018 Kalergis et al.
2013/0038080 A1 2/2013 Tate, Jr.
2014/0001798 A1* 1/2014 Kalergis .................. B60R 7/043 297/188.08
2016/0129845 A1* 5/2016 Kalergis ................. B60N 2/305 297/188.1
2018/0111561 A1* 4/2018 Kalergis ................. B60N 2/305
2019/0351798 A1 11/2019 Bhatia et al.
2022/0340085 A1 10/2022 Li
2025/0058684 A1* 2/2025 Bonk ................. B60N 2/01591

FOREIGN PATENT DOCUMENTS

CN 107985210 A 5/2018

* cited by examiner

*Primary Examiner* — Wenwei Zhuo
(74) *Attorney, Agent, or Firm* — Vichit Chea; Price Heneveld LLP

(57) ABSTRACT

A vehicle seat and storage system has a seat base moveable between a seating position and an upright stowed position, a first storage bin configured to be deployed below the seat base in the seating position, and a fastener system. The fastening system is configured to couple the first storage bin to the seat base such that the first storage bin moves with the seat base to the upright stowed position when the fastening system is fastened and remains below the seat base when the fastening system is unfastened.

14 Claims, 7 Drawing Sheets

VEHICLE SEAT AND STORAGE SYSTEM

FIELD OF THE DISCLOSURE

The present disclosure generally relates to vehicle seating and storage assemblies, and more particularly relates to a vehicle seating assembly having a flip seat and an underseat cargo storage system.

BACKGROUND OF THE DISCLOSURE

Motor vehicles are commonly equipped with seating assemblies that include a seat base and a seat back. In some motor vehicles such as pickup trucks, a flip seat has a seat base may fold from a seating position to an upright stowed position. In addition, a storage compartment may be located under the seat base, generally affixed to or supported on the vehicle floor. It would be desirable to provide for a vehicle seat and storage system that provides efficient utilization of the vehicle cargo space.

SUMMARY OF THE DISCLOSURE

According to a first aspect of the present disclosure, a vehicle seat and storage system has a seat base moveable between a seating position and an upright stowed position, a first storage bin configured to be deployed below the seat base in the seating position, and a fastener system. The fastening system is configured to couple the first storage bin to the seat base such that the first storage bin moves with the seat base to the upright stowed position when the fastening system is fastened and remains below the seat base when the fastening system is unfastened.

Embodiments of the first aspect of the present disclosure can include any one or a combination of the following features:

- the first storage bin is exposed on a top side when the seat base is in the upright stowed position and unfastened with the fastening system;
- the first storage bin is covered by the seat base when the fastening system is fastened to the seat base;
- a second storage bin disposed below the first storage bin;
- the second storage bin is configured to matingly engage the first storage bin when the fastening system is unfastened;
- the second storage bin is configured to fold upward about a hinge to matingly engage the first storage bin when the vehicle seat and storage system is in the stowed position;
- the first and second storage bins each comprise a clam shell configuration that matingly engages each other;
- the seat base is provided in a second row seating of a pickup truck; and
- a seat back, wherein the seat base is substantially perpendicular to the seat back in the upright stowed position.

According to a second aspect of the present disclosure, a vehicle seat and storage system has a seat base moveable between a seating position and an upright stowed position, an upper storage bin configured to be deployed below the seat base in the seating position, a lower storage bin disposed below the upper storage bin, and a fastening system. The fastening system is configured to couple the upper storage bin to the seat base such that the upper storage bin moves with the seat base to the upright stowed position when the fastening system is fastened and remains below the seat base when the fastening system is unfastened.

Embodiments of the second aspect of the present disclosure can include any one or a combination of the following features:

- the upper storage bin is exposed when the seat base is in the upright stowed position and unfastened with the fastening system;
- the upper storage bin is covered by the seat base when the fastening system is fastened to the seat base;
- the lower storage bin is configured to matingly engage the upper storage bin when the fastening system is unfastened;
- the lower storage bin is configured to fold upward about a hinge to engage the upper storage bin when the seat base is in the stowed position;
- the upper and lower storage bins each comprise a clam shell configuration that matingly engages in another;
- the seat base is provided in a second row seating of a pickup truck; and
- a seat back wherein the seat base is substantially perpendicular to the seat back in the stowed position.

According to a third aspect of the present disclosure, a vehicle includes a cabin interior, a floor, and a seat and storage system supported on the floor. The seat base is moveable between a seating position and an upright stowed position, a first storage bin configured to be deployed below the seat base in the seating position, and a fastening system configured to couple the first storage bin to the seat base. The first storage bin moves with the seat base to the upright stowed position when the fastening system is fastened and remains below the seat base when the fastening system is unfastened.

Embodiments of the third aspect of the present disclosure can include any one or a combination of the following features:

- a second storage bin disposed below the first storage bin; and
- a seat back wherein the seat base is substantially perpendicular to the seat back in the stowed position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
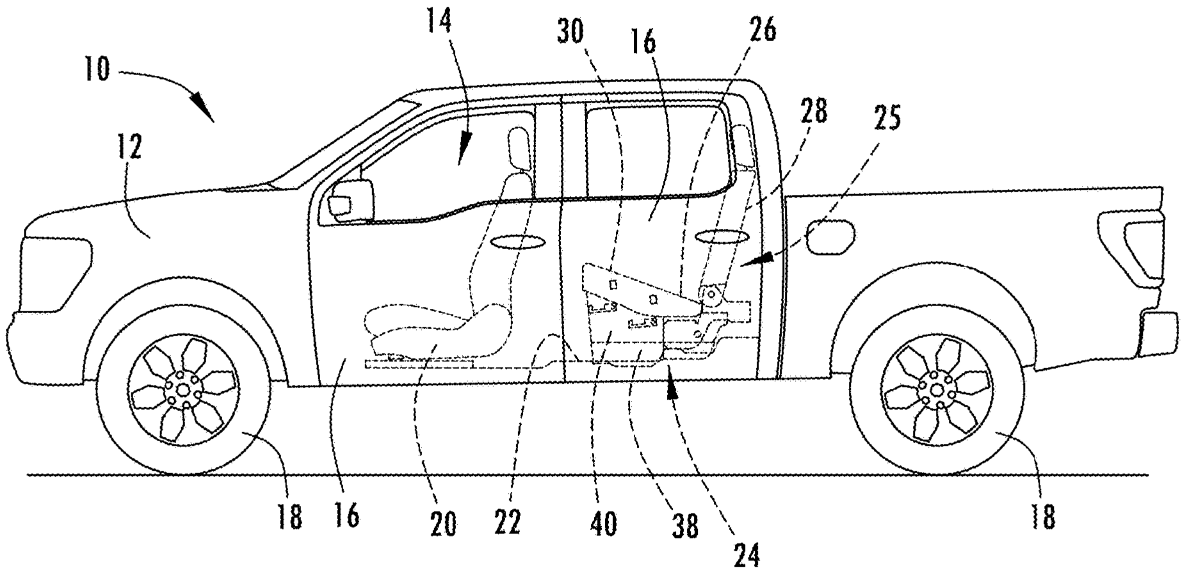
FIG. 1 is a side view of a motor vehicle in the form of a pickup truck having a cabin interior equipped with a vehicle seat and storage assembly with the seat base in a seating position.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seat and storage system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
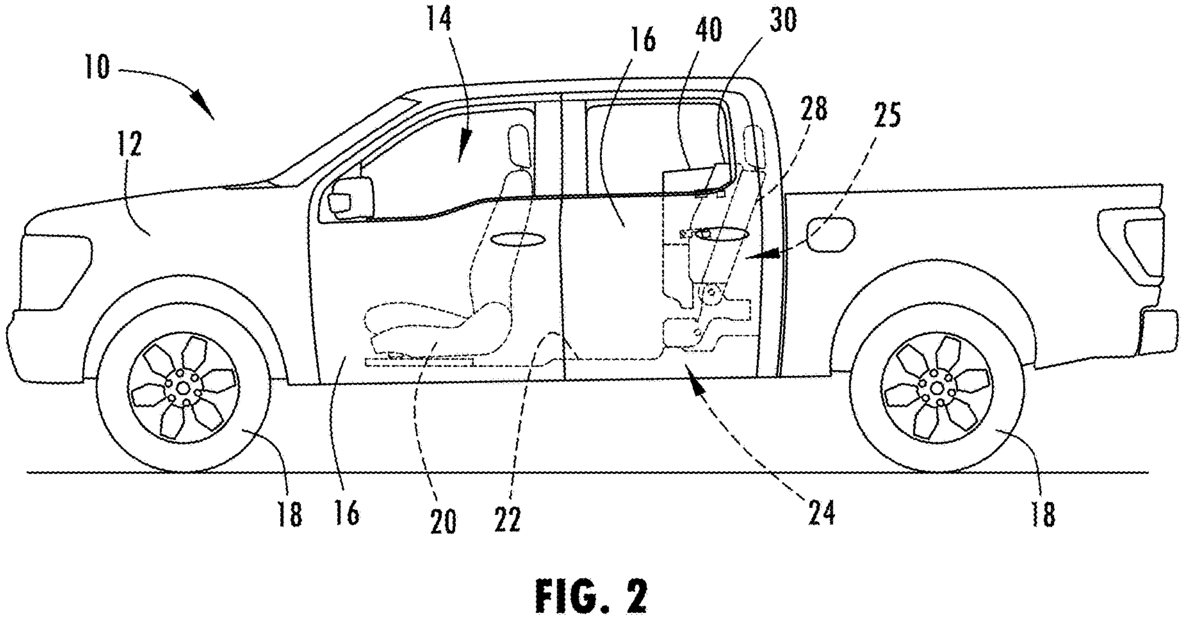
FIG. 2 is a side view of the motor vehicle illustrating the seat base in an upright stowed position.

Referring to FIGS. 1 and 2, an automotive or motor vehicle 10 is generally illustrated in the form of a pickup truck having a body 12 defining a cabin interior 14 which includes a front row of seats 20 and a rear row of seats 25. The vehicle body 12 has access doors 16 on each of the opposite lateral sides, generally proximate to the front row of seats 20 and the rear row of seats 25. The motor vehicle 10 has a plurality of road wheels 18 driven by a motor and is equipped to transport one or more passengers and cargo.

The motor vehicle 10 is configured with a vehicle seat and storage system 24 in the rear row of seats 25 of the cabin interior 14. The seat 25 is a seating assembly that includes a seat base 30 and an upright seat back 28. The seat base 20 and the seat back 28 are interconnected with a seat frame 32 which is supported on and connected to a floor 22 in the cabin interior 14. The seat base 30 is a flip type seat base that may be configured in a seating position as seen in FIG. 1, which is generally horizontal with a slight forward incline and may rotate about a pivot axis 34 to flip to an upright stowed position which is generally vertical and oriented generally parallel to the seat back 28 as shown in FIG. 2.

It should be appreciated that the seat 24 is supported on the floor 22 of the motor vehicle 10 and has cargo space underneath the seat base 30 when the seat base 30 is in the seating position. Disposed below the seat base 30 when in the seating position is an underseat storage system 36. The underseat storage system 36 includes a lower storage bin 38 generally positioned to be supported on the floor 22. The lower storage bin 38 may extend vehicle rearward to a position below the seat back 30 or at least a portion thereof. The lower storage bin 38 may be configured as a clam shell type bin made of polymeric material, for example, which has a hinge, such as a living hinge, extending laterally in the cabin interior 14 to allow the front portion of the lower storage bin 38 to rotate approximately 90° upward to a vertical position.

The underseat storage system 36 also includes an upper storage bin 40 which rests on top of the lower storage bin 38. The upper storage bin 40 may be configured as a clam shell type bin made of polymeric material, for example. The upper storage bin 40 has a bottom wall that generally conforms to a shape and size of the periphery of the lower storage bin 38 such that the upper storage bin 40 covers the open top end of the lower storage bin 38 and matingly rests on top thereof such as to fit together. The upper storage bin 40 has side walls that generally define the shape of the upper storage bin and storage space and has an open top end. The upper storage bin 40 preferably extends forward of the seatback 28.

Figure 3:
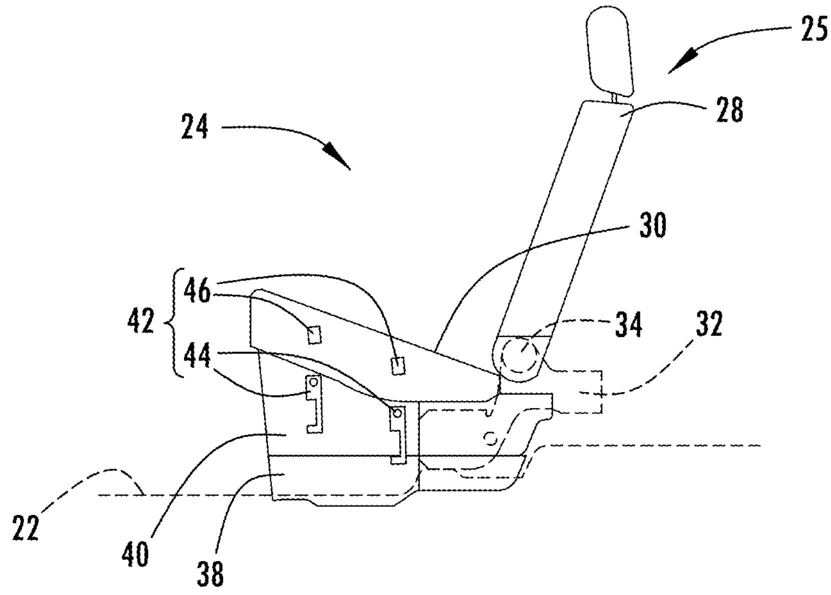
FIG. 3 is a side view of the vehicle seat and storage system, further illustrating the seat base in the seating position with underseat upper and lower storage bins disposed below.
Figure 3A:
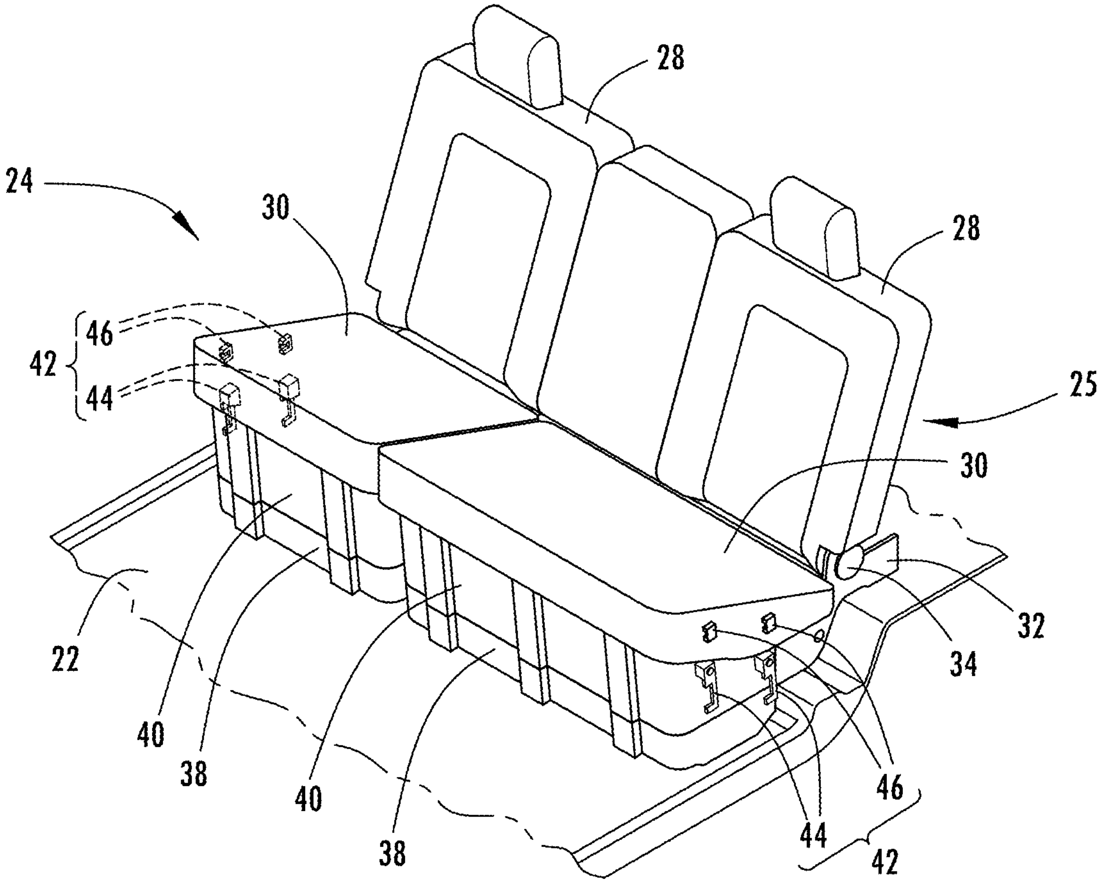
FIG. 3A is a front side perspective view of the vehicle seat and storage system with the seat base in the seating position.

As seen in FIGS. 3 and 3A, the upper storage bin 40 of the underseat storage system 36 is covered by the seat base 30 when the seat base 30 is in the seating position. In this configuration, cargo items may be stored and retained within both the upper and lower storage bins 40 and 38 and concealed from view. The upper and lower storage bins 40 and 38 are also referred to herein as first and second storage bins, respectively.

Figure 4:
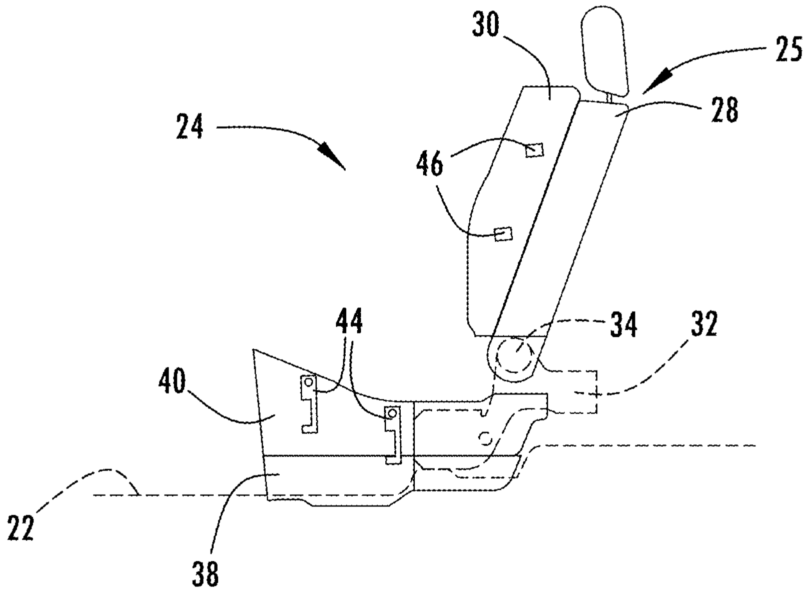
FIG. 4 is a side view of the vehicle seat and storage system, with the seat base rotated upward to the stowed position and exposing the underseat upper and lower storage bins.
Figure 4A:
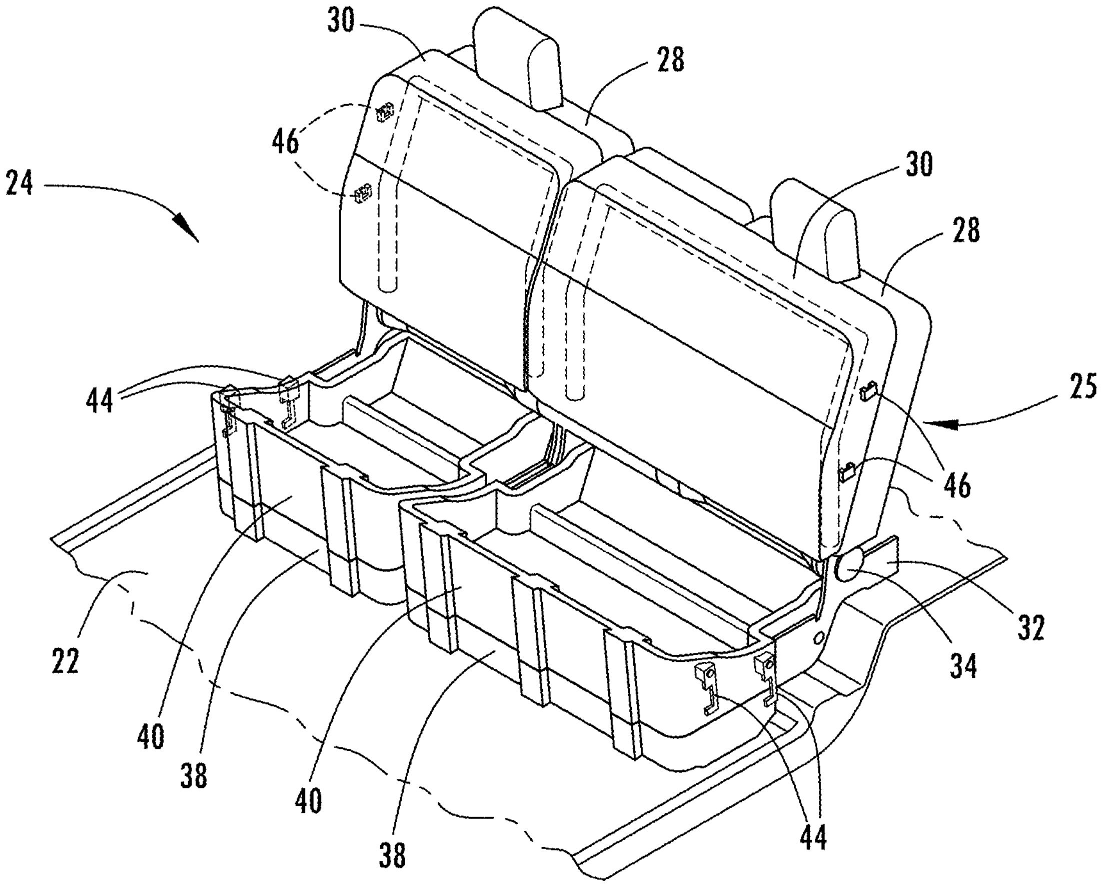
FIG. 4A is a front perspective view of the vehicle seat and storage system with the seat base in the stowed position.

The seat base 30 may be rotated about a pivot axis 34 and thereby flipped or folded upward to the stowed position as seen in FIGS. 4 and 4A. In this configuration, the upper storage bin 40 and lower storage bin 38 remain in place supported on the vehicle floor 22, and the upper storage bin 40 is exposed with an open top end. This may enable a user or passenger to access the storage compartment in the upper storage bin 40 to place into or retrieve items therefrom. It should be appreciated that the seat base 30 may be latched to be held in the stowed position and may be released upon unlatching the latch to allow the seat base 30 to rotate and fold down to return to the seating position.

As seen in the example in FIGS. 3A and 4A, the seat 25 is configured as a split 60/40 bench style seat having two sections, each section having its own seat base 30 and separate upper and lower storage bins 40 and 38 in the underseat storage system 36. This seat configuration has separate seat backs 28 but may utilize a common seat back 28 that extends rearward of both sections of the seat base 30. It should be appreciated that the seat 25 and the vehicle seat and storage system 24 may be configured with a single seat base 30 and underseat storage system 36 or with two seat bases and underseat storage systems as shown in the example, or may include more than two seat bases and under storage systems.

Figure 5:
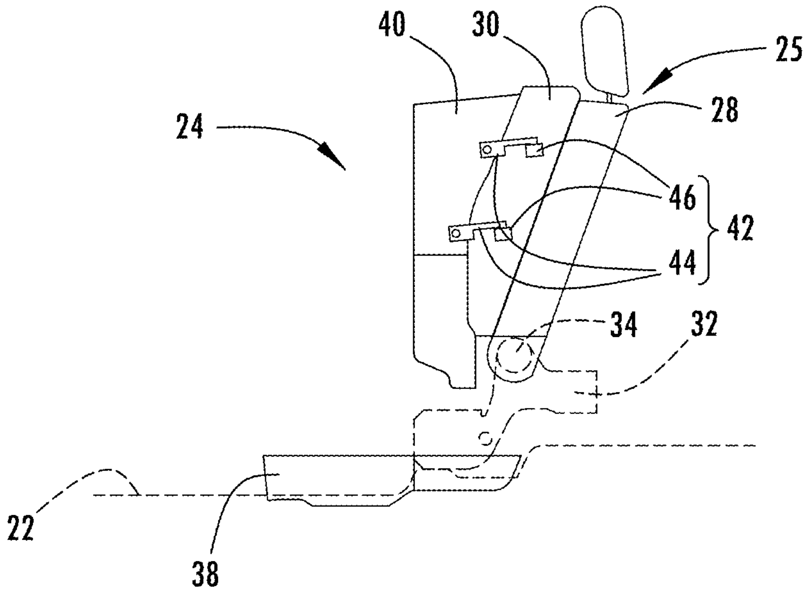
FIG. 5 is a side view of the vehicle seat and storage system illustrating the upper storage bin fastened onto the seat base with the seat base in the stowed position.
Figure 5A:
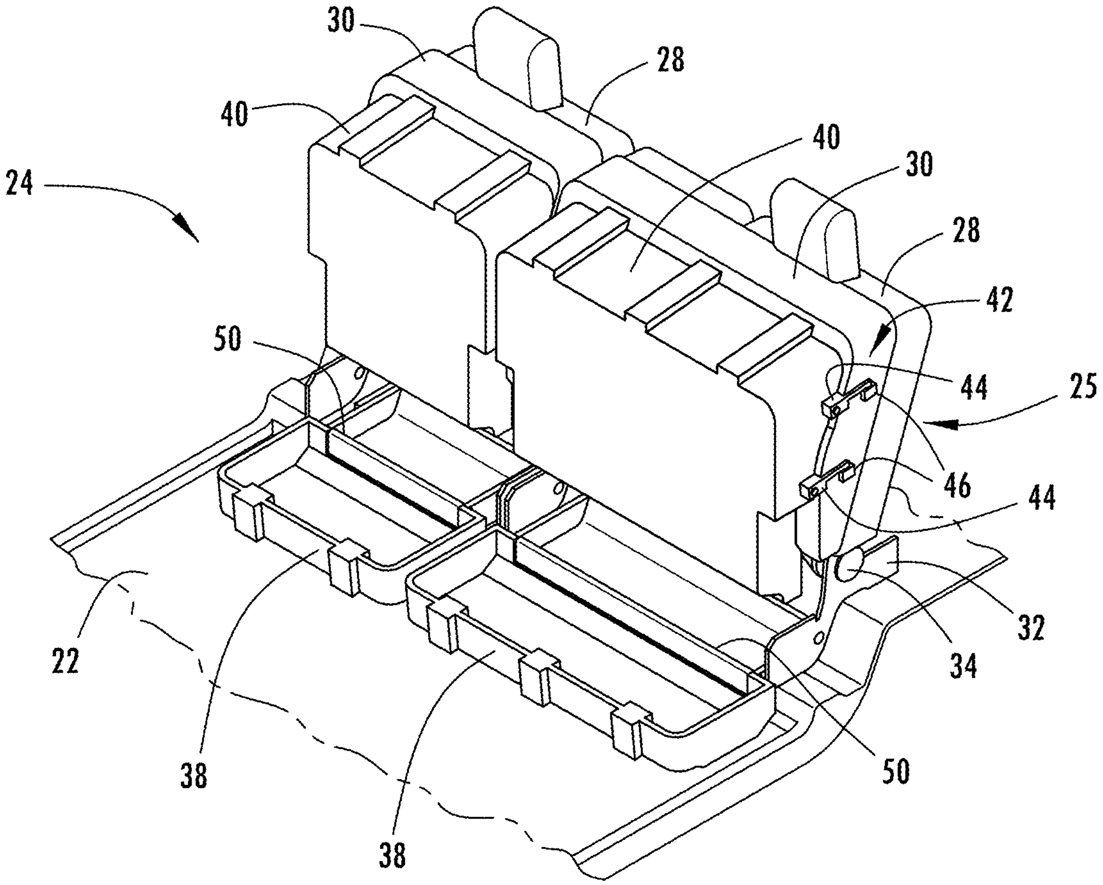
FIG. 5A is a front perspective view of the vehicle seat and storage system with the upper storage bin fastened to the seat base in the stowed position.

Referring to FIG. 5, the vehicle seat and storage system 24 is shown with the seat base 30 in the stowed position and the upper storage bin 40 fastened to the seat base 30 such that the upper storage bin 40 is retained to the underside of the seat base 30. The fastened connection of the upper storage bin 40 to the lower portion of the seat base 30 may be achieved with a fastening system 42. One example of the fastening system 42 is shown having a pair of connector arms 44 rotatably connected to the lateral sides of the upper storage bin 40 and a pair of retainer members 46 on the lateral sides of the seat base 30. The connector arms 44 may be rotated into a fastened position engaged on the retainers 46 to retain the upper storage bin 40 connected to the seat base 30. It should be appreciated that the fastening system 42 may otherwise be configured with one or more different connectors, according to other examples.

Figure 6:
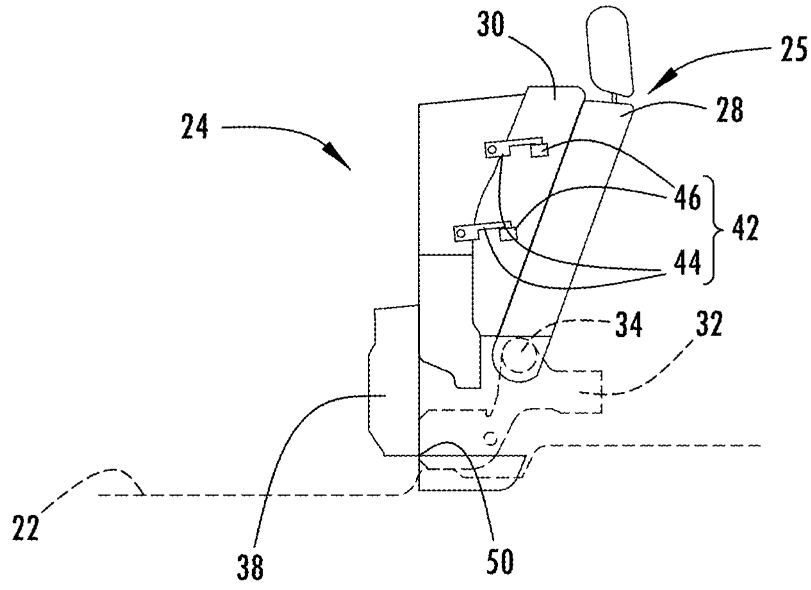
FIG. 6 is a side view of the vehicle seat and storage system illustrating the upper and lower storage bins coupled to the seat base in the stowed position.
Figure 6A:
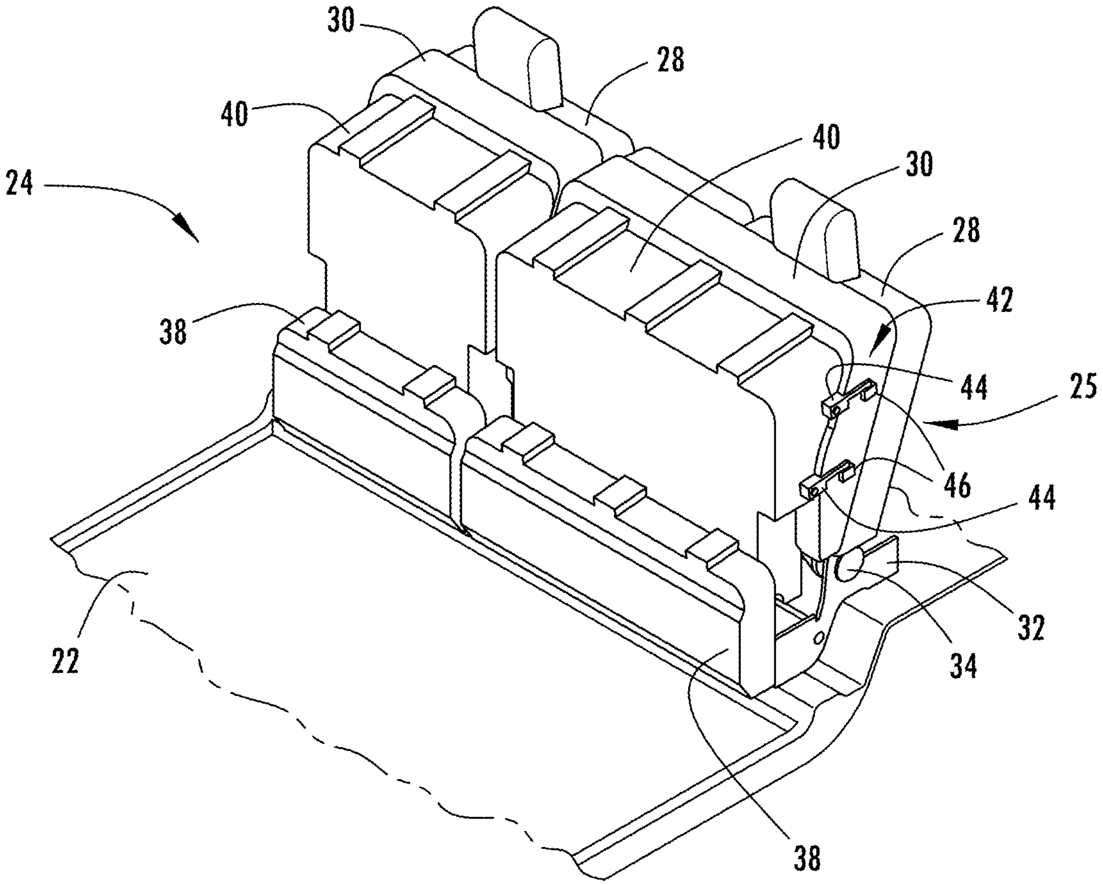
FIG. 6A is a front perspective view of the vehicle seat and storage system with the upper and lower storage bins coupled to the seat base in the stowed position.

With the upper storage bin 40 fastened onto the seat base 30 and the seat base 30 in the folded upright stowed position, the lower storage bin 38 resting on the floor 22 is exposed having an open top end. The lower storage bin 38 has a bottom wall and side walls that define a lower compartment for holding one or more cargo items. The lower storage bin 38 may include a hinge, such as a living hinge 50 extending on a lateral axis of the vehicle, which allows the front portion of the lower storage bin 38 to rotate upward about the living hinge 50 relative to the rear portion of the lower storage bin 38 such as is shown in FIGS. 6 and 6A. In this upward rotated position, the lower storage bin 38 may abut and contact the lower surface of the upper storage bin 40 to provide an enhanced storage space on the floor 22 generally forward of the stowed seat. It should be appreciated that the lower storage bin 38 may be further fastened or connected onto a portion of the upper storage bin 40, such as the bottom or side wall, using one or more fasteners in a fastening system to retain the lower storage bin 38 in the upward rotated configuration.

Figure 7:
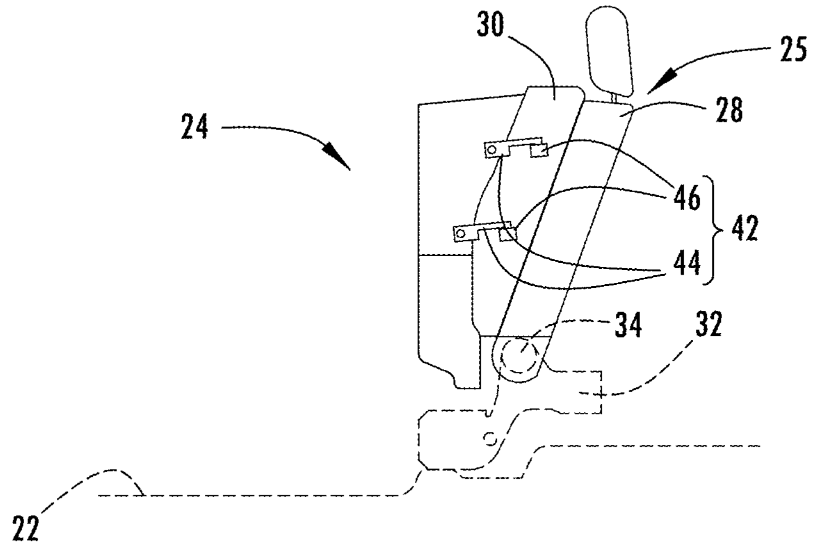
FIG. 7 is a side view of the vehicle seat and storage system illustrating the upper storage bin fastened to the seat base in the stowed position and the lower storage bin removed from the vehicle floor.
Figure 7A:
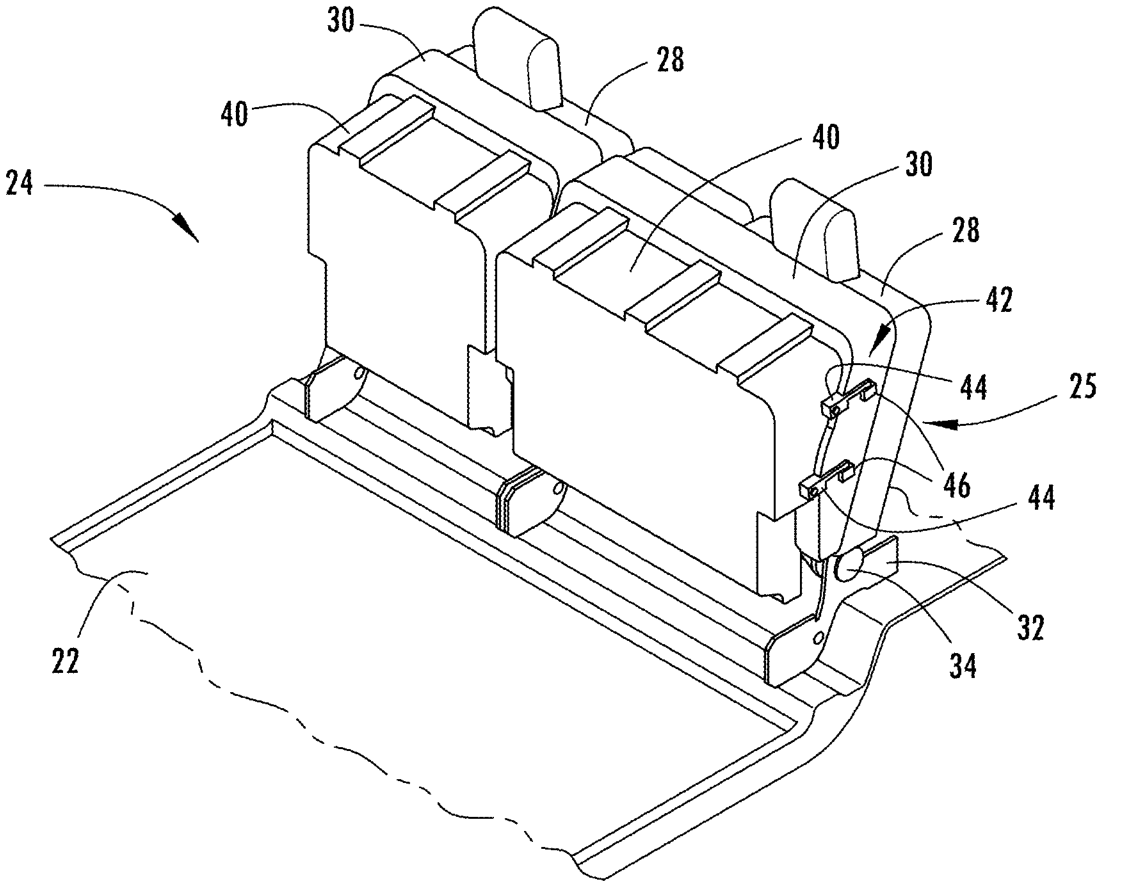
FIG. 7A is a front perspective view of the vehicle seat and storage system as shown in FIG. 7 with the lower storage bin removed.

Referring to FIG. 7, the vehicle seat and storage system 24 is illustrated with the seat base 30 in the upright stowed position and fastened onto the upper storage bin 40 and the lower storage bin 38 is illustrated removed from the motor vehicle 10. The lower storage bin 38 may be made of a clam shell material, such as a polymeric material. The living hinge 50 may be formed in the polymeric material forming the lower storage bin 38. The lower storage bin 38 may be easily removed by a user from the position resting on the vehicle floor 22. This allows for a greater storage area on the vehicle floor 22 generally in the region forward of the seat 25.

Figure 8:
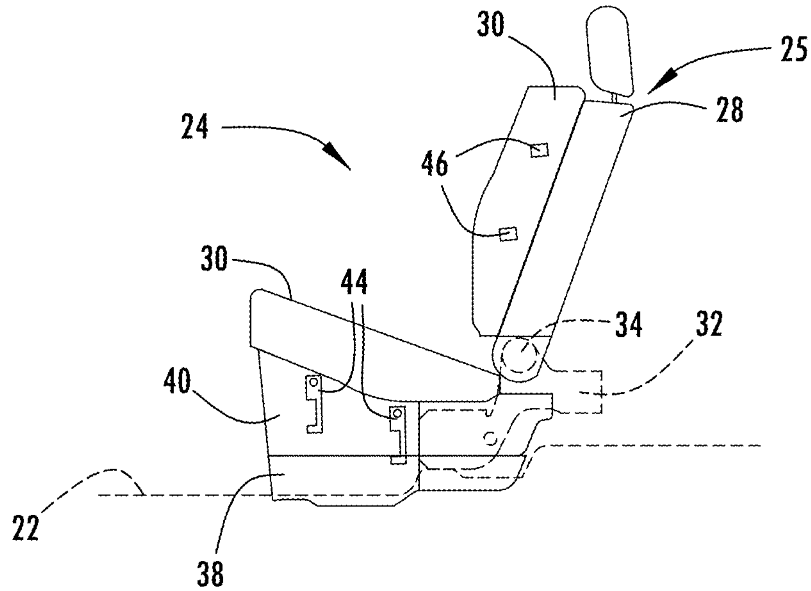
FIG. 8 is a side view of the vehicle seat and storage system with one seat base in the seating position and the other seat base in the stowed position.
Figure 8A:
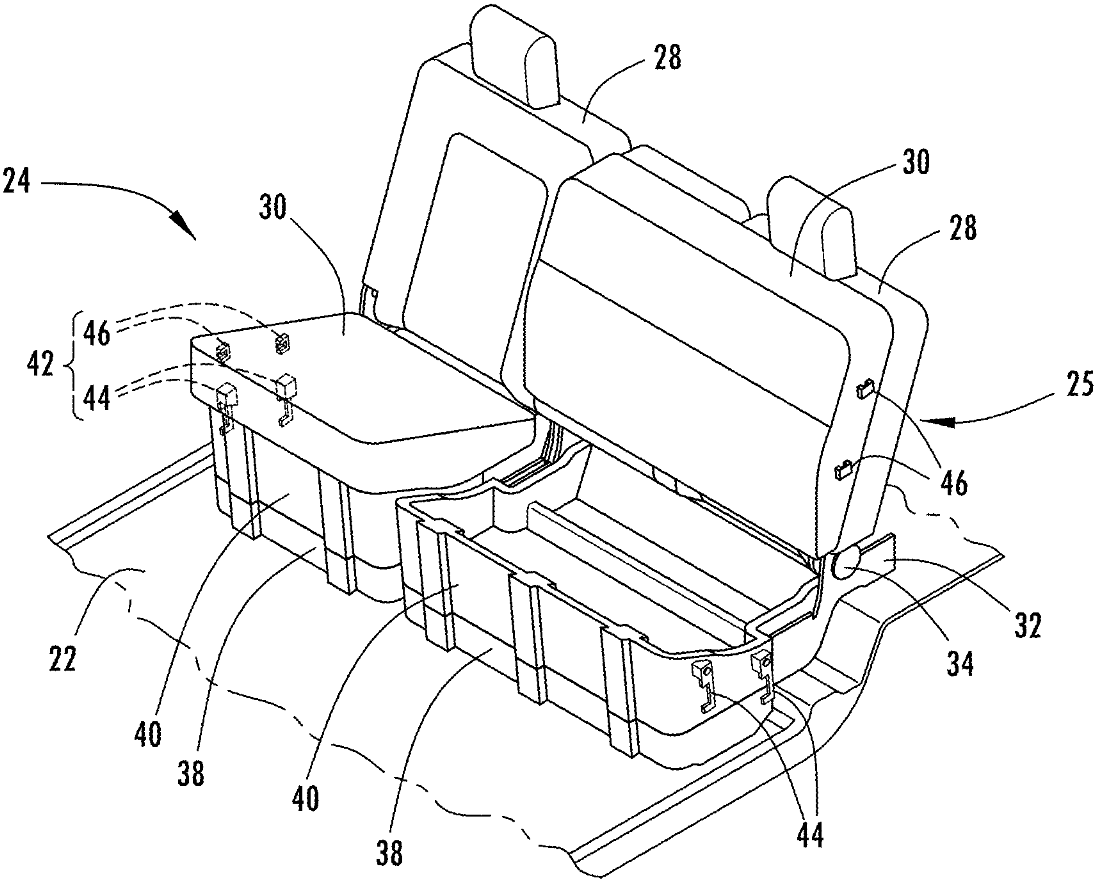
FIG. 8A is a front perspective view of the vehicle seat and storage system as seen in FIG. 8 with one seat base in the seating position and the other seat base in the stowed position.

Referring to FIGS. 8 and 8A, the vehicle seat and storage system 24 is further illustrated having one of the two seat bases 30 in the upright stowed position and the other seat base 30 in the seating position. As such, each seating area of the seat 25 may be independently configured with the seat bases to cover the respective upper storage bins 40 in the seating position or to expose the upper storage bins 30 in the upright stowed position or to fasten the upper storage bins 40 to the seat bases 30, and each of the under-storage compartments 36 may be independently configured.

Accordingly, a vehicle seat and storage system 24 is provided which advantageously provides for a compact and efficient utilization of a vehicle seat 25 with underseat storage in the under-storage compartment which is configured to hold cargo. The reconfiguration of the vehicle seat and storage system 24 provides an efficient and flexible storage arrangement within the motor vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seat and storage system comprising:
- a seat base movable between a seating position and an upright stowed position;
- a first storage bin configured to be deployed below the seat base in the seating position;
- a fastening system configured to couple the first storage bin to the seat base such that the first storage bin moves with the seat base to the upright stowed position when the fastening system is fastened and remains below the seat base when the fastening system is unfastened; and
- a second storage bin disposed below the first storage bin, wherein the second storage bin is configured to matingly engage the first storage bin when the fastening system is unfastened, and wherein the second storage bin is configured to fold upward about a hinge to matingly engage the first storage bin when the vehicle seat and storage system is in the stowed position.

2. The vehicle seat and storage system of claim 1, wherein the first storage bin is exposed on a top side when the seat base is in the upright stowed position and unfastened with the fastening system.

3. The vehicle seat and storage system of claim 1, wherein the first storage bin is covered by the seat base when the fastening system is fastened to the seat base.

4. The vehicle seat and storage system of claim 1, wherein the first and second storage bins each comprise a clam shell configuration that matingly engages in each other.

5. The vehicle seat and storage system of claim 1, wherein the seat base is provided in a second row seating of a pickup truck.

6. The vehicle seat and storage system of claim 1, further comprising a seat back, wherein the seat base is substantially parallel to the seat back in the upright stowed position.

7. A vehicle seat and storage system comprising:
- a seat base moveable between a seating position and an upright stowed position;
- an upper storage bin configured to be deployed below the seat base in the seating position;
- a lower storage bin disposed below the upper storage bin; and
- a fastening system configured to couple the upper storage bin to the seat base such that the upper storage bin moves with the seat base to the upright stowed position when the fastening system is fastened and remains below the seat base when the fastening system is unfastened, wherein the upper storage bin is covered by the seat base when the fastening system is fastened to the seat base, and wherein the lower storage bin is configured to fold upward about a hinge to engage the upper storage bin when the seat base is in the stowed position.

8. The vehicle seat and storage system of claim 7, wherein the upper storage bin is exposed when the seat base is in the upright stowed position and unfastened with the fastening system.

9. The vehicle seat and storage system of claim 7, wherein the lower storage bin is configured to matingly engage the upper storage bin when the fastening system is unfastened.

10. The vehicle seat and storage system of claim 7, wherein the upper and lower storage bins each comprise a clam shell configuration that matingly engages in another.

11. The vehicle seat and storage system of claim 7, wherein the seat base is provided in a second row seating of a pickup truck.

12. The vehicle seat and storage system of claim 7, further comprising a seat back, wherein the seat base is substantially parallel to the seat back in the stowed position.

13. A vehicle comprising:
- a cabin interior;
- a floor; and
- a seat and storage system supported on the floor and comprising:
  - a seat base moveable between a seating position and an upright stowed position;
  - a first storage bin configured to be deployed below the seat base in the seating position;
  - a fastening system configured to couple the first storage bin to the seat base such that the first storage bin moves with the seat base to the upright stowed position when the fastening system is fastened and remains below the seat base when the fastening system is unfastened; and
  - a second storage bin disposed below the first storage bin, wherein the second storage bin is configured to fold upward about a hinge to engage the first storage bin when the seat base is in the stowed position.

14. The vehicle seat and storage system of claim 13, further comprising a seat back, wherein the seat base is substantially parallel to the seat back in the stowed position.

* * * * *